3,812,124
METHOD FOR PREPARING THIAMINE SALTS

Hozumi Tanaka, Ashiya, Kenji Ikawa, Osaka, and Fumitaka Takami, Higashiosaka, Japan, assignors to Shionogi & Co., Ltd., Osaka, Japan
No Drawing. Continuation-in-part of abandoned application Ser. No. 8,427, Feb. 3, 1970. This application June 2, 1972, Ser. No. 259,303
Claims priority, application Japan, Feb. 25, 1969, 44/14,103
Int. Cl. C07d 99/12
U.S. Cl. 260—256.6          1 Claim

ABSTRACT OF THE DISCLOSURE

Thiamine salts of high purity are obtained by treating thiamine monothiocyanate with hydrochloric acid or nitric acid and heating the mixture under reduced pressure until the produced hydrogen monothiocyanate is expelled from the reaction mixture.

BACKGROUND OF THE INVENTION

Field of the invention

The present invention is a continuation-in-part application of Ser. No. 8,427, filed on Feb. 3, 1970 (now abandoned). The present invention generally relates to a process for preparing thiamine salts. Particularly, it is concerned with a process for preparing the thiamine salts by treating thiamine monothiocyanate with hydrochloric acid or nitric acid and heating the mixture under reduced pressure until the produced hydrogen monothiocyanate is expelled from the reaction mixture.

Description of the prior art

At present, most thiamine derivatives are prepared from 3-[2'-methyl-4'-aminopyrimidyl-(5')]-methyl - 4 - methyl-5-$\beta$ - hydroxyethyl-thiothazolone-(2) (hereinafter, referred to as $SB_1$), and a process of oxidizing said $SB_1$ and then eliminating the sulfate ion remaining in the reaction mixture by converting the ion into barium sulfate or by use of an ion exchange resin to obtain thiamine derivatives, is already known.

Complete removal of said sulfate ion with barium chloride is however very difficult in view of the critical amount of the chloride required for the neutralization and, in addition to this, there is an adverse tendency of lowering the purity of the end product due to the contamination with barium salts. The employment of an ion exchange resin also shows an adverse effect on the quality of the end product, for instance, thiamine hydrochloride because the thiamine in the reaction system is decomposed during the prolonged time required for concentrating the reaction solution which has once been diluted and for precipitating the thiamine hydrochloride.

A process for deriving $SB_1$ into thiamine monothiocyanate in its first step and then converting the monothiocyanate into the required thiamine salts by the action of hydrochloric acid or nitric acid is proposed to insure the purity of the product. This process, although it seems to be easy at first sight, is, however, very difficult to perform because thiamine salts can be arranged in the order of decreasing solubility as follows:

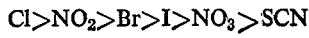

and accordingly, a former one in the above row can be passed to a latter one by means of simple double decomposition but not vice versa.

SUMMARY OF THE INVENTION

It is the primary object of the present invention to provide a method of preparing thiamine salts. It is another object of the present invention to provide a method of converting thiamine monothiacyanate into the required thiamine salts of high purity by overcoming the aforedescribed difficulty.

These and other objects of the present invention and attendant advantages thereof will be apparent to those who are conversant with the art to which the present invention pertains by the following detailed disclosure in the specification as well as in the appended claims.

According to the present invention, the aforementioned difficulty is obviated by providing a process for preparing thiamine salts comprising; treating thiamine monothiocyanate with hydrochloric acid or nitric acid and concentrating the mixture with heat under reduced pressure until the produced hydrogen monothiocyanate is expelled from the mixture.

The reaction can preferably be performed at a bath temperature of about 50–80° C. under reduced pressure below about 25 mm. Hg abs. The reaction conditions need not be restrictive so long as the expelling of the formed hydrogen monothiocyanate may effectively be made. Although the reaction period may vary with the size of the reaction vessel and the reaction mixture, the reaction can usually be carried out in about 0.5–2 hours.

The following examples are given for the purpose of illustration.

EXAMPLE 1

Thiamine monothiocyanate (60 g.) is dissolved in 10% hydrochloric acid (250 g.) and the mixture is concentrated under reduced pressure (10–20 mm. Hg abs.) at a bath temperature of 60–80° C. An addition of warmed ethanol effected when crystals begin to precipitate, accelerates the precipitation. Standing the reaction mixture overnight under ice-cooling and a subsequent filtration of the mixture affords 57 g. (96%) of thiamine hydrochloride (M.P. 250° C., with decomposition).

Starting material (thiamine monothiocyanate) is prepared as follows:

To a solution of 30% hydrogen peroxide (71.4 g.) diluted with water (170 ml.), there is added portionwise 3-[2'-methyl-4'-aminopyrimidyl-(5')]-methyl - 4 - methyl-5-$\beta$-hydroxyethyl-thiothiazolone - (2) (59.2 g.) while maintaining the temperature of the solution at 20–25° C. The mixture is then stirred for 1.5 hours at this temperature. It is thereafter cooled with ice and 2 g. of manganese dioxide is incorporated therein, and further stirred for 2 hours to decompose the remaining hydrogen peroxide. Treatment of the pale yellowish reaction mixture with decoloring charcoal make the solution colorless and transparent. Addition of ammonium thiocyanate (18.3 g.) at 25–30° C. and a dropwise addition of 20% $Na_2CO_3$ initiates precipitation of crystals of thiamine monothiocyanate. The dropwise addition continues until the mixture exhibits a pH of 6–7 and then it is ice-cooled while being stirred for a few minutes. A water rinsing of the precipitated crystals collected by filtration affords crystals (M.P. 192–193° C., with decomposition) of thiamine monothiocyanate (63.5 g., 93%).

EXAMPLE 2

A reaction substantially the same as that described in Example 1 is performed. In this example, however, 37.71 g. (0.359 mol) of 60% nitric acid and 150 ml. of water in lieu of the hydrochloric acid of Example 1, are used for 60 g. (0.176 mol) of thiamine monothiocyanate, and 61.7 g. (90%) of thiamine dinitrate (M.P. 162–165° C.) is obtained as the product.

What we claim is:

1. A process for preparing thiamine hydrochloride comprising treating thiamine monothiocyanate with hydrochloric acid and concentrating the mixture with heat under reduced pressure of below 25 mm. Hg abs. until the produced hydrogen thiocyanate is expelled from the mixture at a bath temperature of about 50–80° C.

References Cited

FOREIGN PATENTS 2,008,333   9/1970   Germany _____ 260—256.6

RICHARD J. GALLAGHER, Primary Examiner

U.S. Cl. X.R.

260—256.5 B